United States Patent [19]

Hime

[11] Patent Number: 4,889,388
[45] Date of Patent: Dec. 26, 1989

[54] TRANSPORTABLE SEAT INSERT ESPECIALLY ADAPTED FOR INFANTS

[76] Inventor: Sherry R. Hime, 11444 W. Hawaii Ave., Lakewood, Colo. 80226

[21] Appl. No.: 212,797

[22] Filed: Jun. 29, 1988

[51] Int. Cl.[4] ............................................. A47C 31/00
[52] U.S. Cl. ............................... 297/464; 297/DIG. 1; 297/467; 297/397; 297/250
[58] Field of Search ............... 297/464, 467, 394, 396, 297/DIG. 1, 250

[56] References Cited

U.S. PATENT DOCUMENTS

| | | | |
|---|---|---|---|
| 3,220,769 | 11/1965 | Regan | 297/DIG. 1 |
| 3,762,768 | 10/1973 | Hyde et al. | 297/467 X |
| 4,204,695 | 5/1980 | Salzman | 297/250 X |
| 4,206,945 | 6/1980 | Kifferstein | 297/397 X |
| 4,650,246 | 3/1987 | Henricksson | 297/467 X |
| 4,712,833 | 12/1987 | Swanson | 297/219 |

FOREIGN PATENT DOCUMENTS

| | | | |
|---|---|---|---|
| 2856366 | 2/1980 | Fed. Rep. of Germany | 297/397 |
| 90890 | 12/1957 | Norway | 297/397 |
| 490233 | 8/1938 | United Kingdom | 297/397 |
| 1084948 | 9/1967 | United Kingdom | 297/397 |

Primary Examiner—Peter A. Aschenbrenner

[57] ABSTRACT

A transportable, machine washable, collapsible, compact, lightweight seat insert for supporting a human in a sitting position. The insert includes a box shaped, flexible, resilient, padded frame including a back wall, a pair of side walls, a bottom wall, and a front wall having a pair of openings for accommodating the human's legs. The seat insert further includes a pillow adapted to be selectively disposed above and adjacent to the back wall and attached to the back wall by means of VELCRO fasteners.

24 Claims, 3 Drawing Sheets

TRANSPORTABLE SEAT INSERT ESPECIALLY ADAPTED FOR INFANTS

BACKGROUND OF THE INVENTION

Many persons such as infants and the elderly have difficulty supporting themselves in a sitting position. Also, because conventional seats are often relatively large for the body of an infant or an elderly person, such persons tend to tilt or slouch in these seats, such as high chairs, strollers, car seats, walkers, shopping carts, and swings for infants, and such as wheelchairs, sofas, car seats, and chairs for the elderly.

SUMMARY OF THE INVENTION

The present invention relates to a transportable, machine washable, collapsible, compact, lightweight seat insert for supporting a human in a sitting position. The insert includes a box shaped, flexible, resilient, padded frame including a back wall, a pair of side walls, a bottom wall, and a front wall having a pair of openings for accommodating the human's legs. The seat insert further includes a pillow adapted to be selectively disposed above and adjacent to the back wall and attached to the back wall by means of VELCRO fasteners.

DESCRIPTION OF THE DRAWINGS

The invention will be described with reference to the accompanying drawings wherein.

DESCRIPTION OF A PREFERRED EMBODIMENT

Figure 1:
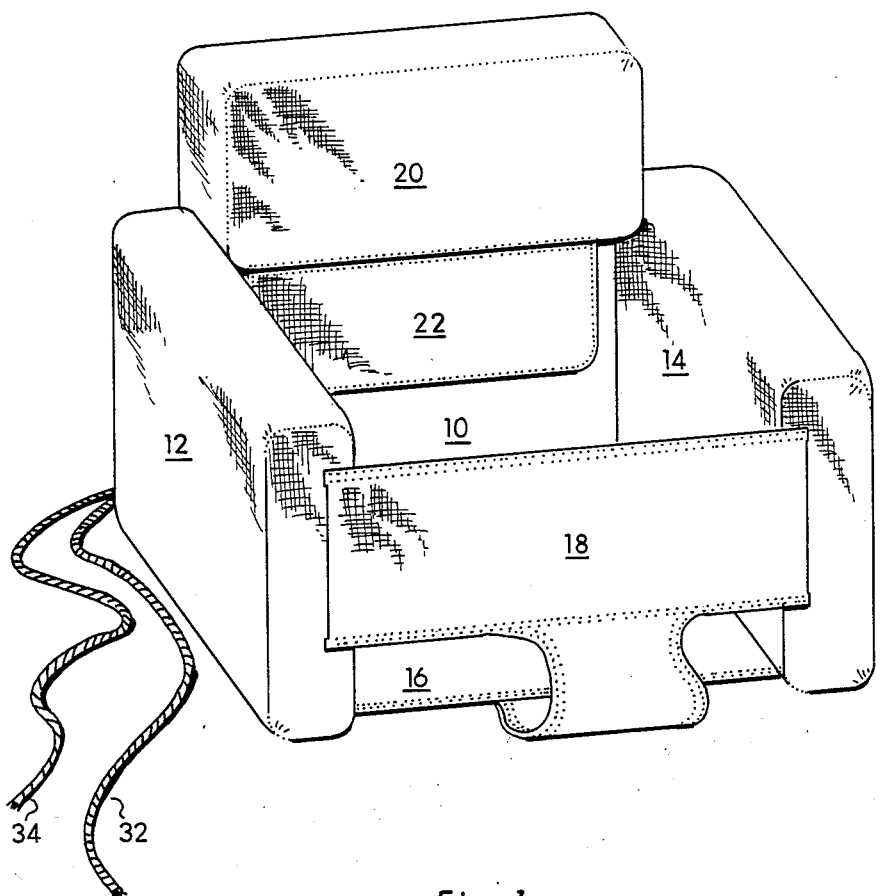
FIG. 1 is a perspective illustration of a seat insert in accordance with one embodiment of the present invention.

The invention will be described with reference to the accompanying drawings wherein like reference numerals refer to the same item. The seat insert shown in FIGS. 1-3 includes an upstanding back wall 10, a pair of upstanding side walls 12, 14, a bottom wall 16, a front wall 18, and a pillow 20.

The back wall 10, the side walls 12, 14, and the pillow 20 each have the dimensions 8 inches, by 5 inches, by 2 inches and are comprised of soft foam rubber covered with a cloth fabric. One lateral edge of the back wall 10 is connected to a lateral edge of the side wall 12, and the other lateral edge of the back wall 10 is connected to the other side wall 14. The back wall 10 and the side walls 12, 14 may be formed of three separate blocks of foam rubber enclosed by a single piece of cloth fabric. The blocks of foam rubber may be maintained in their desired positions within the single piece of cloth fabric by making appropriate stitch lines between the foam rubber blocks. Thus, it will be appreciated that the side walls 12, 14 may bend and flex relative to the back wall 10.

The bottom wall 16 comprises a generally square shaped piece of cloth fabric, one edge of which is connected to the lower edge of the side wall 12 by stitching, another edge of which is connected to the lower edge of the back wall 10 by stitching, and another edge of which is connected to the bottom edge of the side wall 14 by stitching. The bottom wall 16 does not possess any padding.

The front wall 18 is fashioned of two pieces of cloth fabric without padding and is configured in a "T" shape. One fabric piece forms the upper portion of the "T", and the other fabric piece forms the lower portion of the "T". The two pieces are joined together by stitching. The lower edge of the front wall 18 is connected to the front edge of the bottom wall 16 by stitching. One lateral edge of the front wall 18 is connected to a lateral edge of the side wall 12 by stitching; and the other lateral edge of the front wall 18 is connected to the lateral edge of the side wall 14 by stitching. It should be appreciated that the configuration of the front wall 18 provides a pair of apertures for accommodating the legs of the human.

Figure 2:
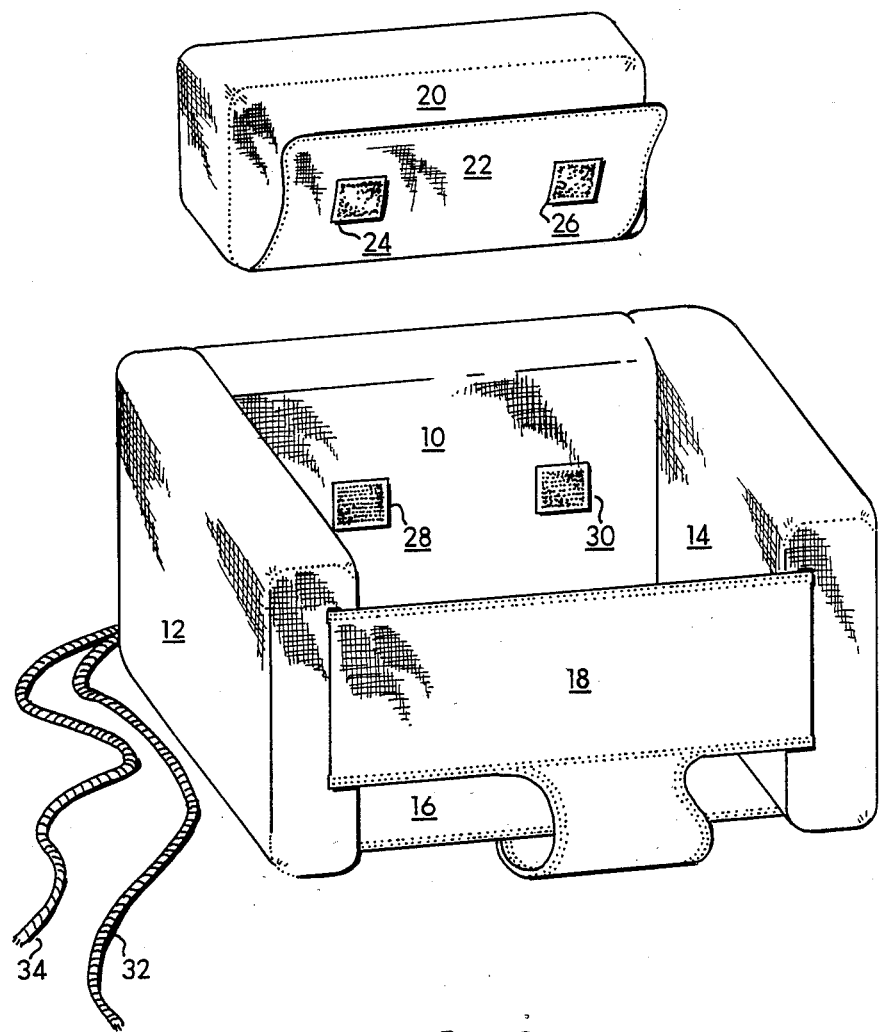
FIG. 2 is a perspective illustration of the seat insert shown in FIG. 1 with the pillow disattached from the back wall of the seat insert.

The pillow 20 includes a depending flap 22 adapted to overlap the front surface of the back wall 10. The rear surface of the flap 22 includes a pair of hook portions 24, 26 of VELCRO fasteners that are adapted to cooperate with a corresponding pair of loop portions 28, 30 of VELCRO fasteners fixedly mounted on the front surface of the back wall 10, as best shown in FIG. 2. These pairs of VELCRO fasteners are used to selectively attach the pillow 20 to the back wall 10. By locating the VELCRO fasteners generally in front of the back wall 10, the weight of a human resting upon the back wall 10 tends to compress the VELCRO fasteners so that the pillow 20 tends to remain attached to the back wall 10 in an upright position.

A pair of strings 32, 34 are attached at one of their perspective ends to the seat insert at the corner where the back wall 10, the side wall 12, and the bottom wall 16 converge. A second pair of strings (not shown) are likewise attached to the corner where the back wall 10, the side wall 14, and the bottom wall 16 converge. These strings are useful for tying the seat insert to a high chair, stroller, shopping cart, or the like so that the seat insert is stabilized and will not slide or tilt.

Figure 3:
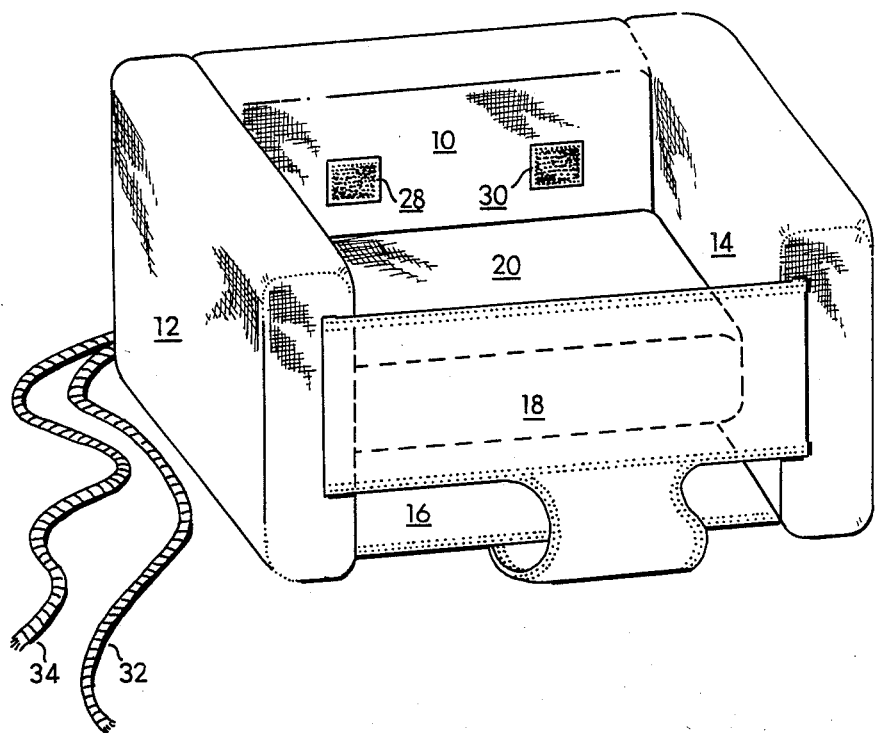
FIG. 3 is a perspective illustration of the seat insert shown in FIGS. 1 and 2 with the pillow disattached from the back wall and disposed adjacent the bottom wall.

When the pillow 20 is disattached from the back wall 10, the pillow 20 may be used as a bottle prop for an infant or as a pillow for supporting an infant's head while sleeping prostrate outside the seat insert. As shown in FIG. 3, the pillow 20 may also be used as a booster disposed adjacent to the bottom wall 16, adjacent to and between the side walls 12, 14, and adjacent to the back wall 10. The use of the pillow 20 as a booster is especially useful when placing a seat insert in a car seat, since most conventional car seats have a "V" shaped angle of intersection between the back of the seat and the bottom of seat of less than 90 degrees. Without the seat insert, an infant would tend to slide into the "V" shaped intersection between the back and the bottom of a car seat, which would cause the upper torso of the infant to be tilted uncomfortably forward. The use of the pillow 20 as a booster would permit the infant to sit in a much more erect and comfortable position. It should also be appreciated that a conventional seat belt may be strapped around an infant sitting within the seat insert.

The entire seat insert is machine washable and is adapted to be soaked with water for washing and cleaning. The seat insert (including the pillow) is also adapted to be collapsed and folded into a volume of about 10 inches, by 8 inches, by 7 inches, or less than about 600 cubic inches. Consequently, the seat insert may be readily carried within a conventional diaper bag. The seat insert (including the pillow) is also extremely lightweight—weighing less than 8 ounces.

It should be further appreciated that the seat insert of the present invention can be readily adapted for convenient use by elderly persons by simply increasing the dimensions of the seat insert. When the seat support is used by elderly persons, it is preferred that the front wall 18 be eliminated.

Although particular embodiments of the present invention have been described and illustrated herein, it should be recognized that modifications and variations may readily occur to those skilled in the art and that such modifications and variations may be made without departing from the spirit and scope of my invention. Consequently, my invention as claimed below may be practiced otherwise as specifically described above.

I claim:

1. A transportable seat insert for supporting a human in a sitting position, said insert fashioned substantially entirely of non-rigid, flexible, compressible materials, said insert comprising:
a substantially upstanding back portion having an upper, a lower, and opposing lateral edges, said back portion formed in an upper section and a lower section;
means for selectively attaching said upper section to said lower section;
a pair of substantially upstanding side portions each having an upper, a lower, and opposing lateral edges, one lateral edge of each side portion being connected to a corresponding one of the lateral edges of said back portion, said side portions being spaced apart and substantially parallel to each other;
a bottom portion extending between and connected to the bottom edge of said back portion and the bottom edges of each of said side portions; and
a front portion connected to the other lateral edges of each of said side portions and connected to said bottom portion, said front portion possessing a configuration providing a pair of openings through which the human's legs are adapted to extend.

2. A transportable seat insert according to claim 1 wherein said upper section is adapted to be disposed substantially directly above said lower section and wherein said upper section includes a flap adapted to be disposed adjacent to said lower section, and wherein said attaching means includes at least two cooperating elements, one element being attached to said flap and the other element being attached to said lower section.

3. A transportable seat insert according to claim 1 wherein said attaching means includes a VELCRO fastener.

4. A transportable seat insert according to claim 2 wherein said attaching means includes a VELCRO fastener.

5. A transportable seat insert according to claim 1 wherein said back portions and said side portions are fashioned substantially entirely of resilient material.

6. A transportable seat insert according to claim 5 wherein said bottom portion and said front portion are unpadded and fashioned of a flexible material.

7. A transportable seat insert according to claim 5 fashioned substantially entirely of foam and fabric material.

8. A transportable seat insert according to claim 1 wherein said insert is adapted to be collapsible into a volume of less than substantially six hundred cubic inches.

9. A transportable seat insert according to claim 1 wherein said upper section is adapted to snugly fit adjacent to and above said bottom portion, adjacent to and between said side portions, and adjacent to said back portion, and is adapted to be disposed beneath the buttocks of the human.

10. A transportable seat insert according to claim 1 further comprising means for selectively securing said insert to an adjacent object.

11. A transportable seat insert according to claim 10 wherein said securing means includes at least one pair of strings, an end of each string connected to said insert substantially at one of the corners of interconnection between said back portion, one of said side portions, and said bottom portion.

12. A transportable seat insert according to claim 1 wherein said side portions are fixedly connected to said back portin, said bottom portion is fixedly connected to said back portion and to said side portions, and said front portion is fixedly connected to said side portions and to said bottom portion.

13. A transportable seat insert according to claim 1 weighing less than substantially eight ounces.

14. A transportable seat insert for supporting a human in a sitting position, said insert fashioned substantially entirely of non-rigid, flexible, compressible materials, said insert comprising:
a substantially box shaped, flexible, collapsible frame including a back wall, a pair of side walls, a bottom wall, and a front wall, said frame having an open top, said front wall being provided with at least one aperture through which the human's legs are adapted to extend;
a pillow adapted to be selectively disposed above and adjacent to said back wall;
means for selectively attaching said pillow to said frame when said pillow is disposed above and adjacent to said back wall; and
said frame and said pillow adapted to be collapsible into a volume of substantially less than six hundred cubic inches.

15. A transportable seat insert according to claim 14 wherein said frame and said pillow are fashioned substantially entirely of foam and fabric material.

16. A transportable seat insert according to claim 14 wherein said pillow includes a flap adapted to be disposed adjacent to said back wall and wherein said attaching means includes at least two cooperating elements, one element being attached to said flap and the other element attached to said back wall.

17. A transportable seat insert according to claim 14 wherein the upper edges of said back wall, and said side wall are substantially coextensive.

18. A transportable seat insert according to claim 14 wherein said pillow is adapted to snugly fit adjacent to and above said bottom wall, adjacent to and between said side walls, and adjacent to said back wall, and is adapted to be disposed beneath the buttocks of the human.

19. A transportable seat insert according to claim 14 wherein said pillow and said frame weigh less than substantially eight ounces.

20. A transportable seat insert according to claim 14 wherein said back wall, said side walls and said pillow are fashioned substantially entirely of resilient material.

21. A transportable seat insert for supporting a human in a sitting position comprising:
- a substantially upstanding back portion having an upper, a lower, and opposing lateral edges, said back portion padded with a flexible, resilient material, said back portion formed in an upper section and a lower section;
- means for selectively attaching said upper section to said lower section;
- a pair of substantially upstanding side portions each having an upper, a lower, and opposing lateral edges, one lateral edge of each side portion being connected to a corresponding one of the lateral edges of said back portion, said side portions padded with a flexible, resilient material, said side portions being spaced apart and substantially parallel to each other;
- a bottom portion extending between and connected to the bottom edge of said back portion and the bottom edges of each of said side portions, said bottom portion being unpadded and fashioned of a flexible material; and
- a front portion connected to the other lateral edges of each of said side portions and connected to said bottom portion, said front portion being unpadded and fashioned of a flexible material, said front portion possessing a configuration providing a pair of openings through which the human's legs are adapted to extend.

22. A transportable seat insert according to claim 1 wherein said insert is adapted to be machine washable and is fashioned substantially entirely of material adapted to be soaked with water for washing and cleaning said insert.

23. A transportable seat insert according to claim 14 wherein said insert is adapted to be machine washable and is fashioned substantially entirely of material adapted to be soaked with water for washing and cleaning said insert.

24. A transportable seat insert according to claim 21 wherein said insert is adapted to be machine washable and is fashioned substantially entirely of material adapted to be soaked with water for washing and cleaning said insert.

* * * * *